(12) United States Patent
Hua et al.

(10) Patent No.: US 9,678,399 B2
(45) Date of Patent: Jun. 13, 2017

(54) ARRAY SUBSTRATE, METHOD OF REPAIRING THE SAME, DISPLAY PANEL AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Ming Hua, Beijing (CN); Guoquan Liu, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/139,651

(22) Filed: Apr. 27, 2016

(65) Prior Publication Data

US 2017/0038652 A1 Feb. 9, 2017

(30) Foreign Application Priority Data

Aug. 3, 2015 (CN) .......................... 2015 1 0481670

(51) Int. Cl.
  *G02F 1/1335* (2006.01)
  *G02F 1/1362* (2006.01)
  *G02F 1/1343* (2006.01)

(52) U.S. Cl.
  CPC .. *G02F 1/136259* (2013.01); *G02F 1/134336* (2013.01); *G02F 1/136286* (2013.01); *G02F 2001/136263* (2013.01)

(58) Field of Classification Search
  CPC .... G02F 2001/133638; H04N 13/0404; H04N 13/0409; H04N 13/0402; G02C 7/083
  See application file for complete search history.

(56) References Cited

U.S. PATENT DOCUMENTS

| | | | |
|---|---|---|---|
| 8,659,523 B2* | 2/2014 | Osame | G09G 3/3233 257/59 |
| 2006/0055037 A1* | 3/2006 | Park | H01L 24/11 257/737 |
| 2008/0272298 A1* | 11/2008 | Kim | G02F 1/1303 250/310 |

* cited by examiner

*Primary Examiner* — Tracie Y Green
(74) *Attorney, Agent, or Firm* — Banner & Witcoff, Ltd.

(57) ABSTRACT

An array substrate, a method of repairing the same, a display panel and a display device are disclosed. A data-line repair line, which is connected with a data line and insulated from a common electrode, is provided in each pixel area in an array substrate and an orthogonal projection of the data-line repair line on a base substrate has an overlapped area with an orthogonal projection of a sub-electrode or a connection line of a common electrode on the substrate. Therefore, if a breakage occurs to a data line at its overlapped area with a gate line on the array substrate, it is able to repair the breakage via the date line repair line and a portion cut out of the common electrode.

19 Claims, 8 Drawing Sheets

ARRAY SUBSTRATE, METHOD OF REPAIRING THE SAME, DISPLAY PANEL AND DISPLAY DEVICE

This application claims priority to and the benefit of Chinese Patent Application No. 201510481670.4 filed on Aug. 3, 2015, which application is incorporated herein in its entirety.

TECHNICAL FIELD

At least one embodiment of the present disclosure pertains to an array substrate, a method of repairing the same, a display panel and a display device.

BACKGROUND

Thin film transistor liquid crystal displays (TFT-LCDs) possess advantages such as low power consumption, no radiation, and have taken a dominant market position among panel displays at present. With a development trend of large-sized display panel, in a fabrication process of such a display panel, data lines are prone to break at the position where they overlap gate lines, which can adversely influence signal transmission.

It is well known that if one data line breaks in a display panel, display effect will be influenced, which can lead to rejection of the display panel, hence influencing yield reduction. Therefore, for a large-size display panel manufacturer, it is very important to increase yield by repairing a data line that is broken.

SUMMARY

An array substrate provided in an embodiment of the present disclosure, comprising: a base substrate; gate lines and data lines that are arranged in a cross manner on the base substrate and a common electrode, wherein the common electrode comprises: sub-electrodes each in pixel areas defined by the gate lines and the data lines, common electrode lines that extend in a same direction as the gate lines and are employed to transmit a common electrode signal to the sub-electrodes, and connection lines that each electrically connects two sub-electrodes that are adjacent to each other in a direction along which the data lines extend; and data-line repair lines that are connected with the data lines and insulated from the common electrode within the pixel areas, wherein an orthogonal projection of the data-line repair lines on the base substrate has an overlapped area with an orthogonal projection of the sub-electrodes or the connection lines on the base substrate.

A display panel is provided in an embodiment of the present disclosure, comprising the array substrate provided in the above embodiment of the present disclosure.

At least one embodiment of the present disclosure further provided a display device, comprising the display panel provided in the above embodiment of the present disclosure.

At least one embodiment of the present disclosure further provides a method for repairing the array substrate provided in the above embodiment of the present disclosure, and the method comprises: determining a breakage position of a data line where an open circuit occurs on the array substrate; determining a common electrode line that is closer to the breakage position on two sides of the breakage position, and determining a data-line repair line that is closer to the breakage position and electrically connected with the data line suffering from the open circuit; as to the determined common electrode line, selecting a welding point at an overlapped area between the common electrode line and the data line, and employing a laser welding process to electrically connect the common electrode line and the data line at the welding point; as to the determined data-line repair line, selecting a welding point at an overlapped area between the data-line repair line and a sub-electrode or at an overlapped area between the data-line repair line and a connection line, and employing a laser welding process to electrically connect the sub-electrode or the connection line at the welding point with the data-line repair line; cutting the common electrode according to the common electrode line and the data-line repair line determined to allow a portion cut out of the common electrode to be insulated from a rest portion and allow the portion cut out of the common electrode to be electrically connect two ends to the breakage position of the data line.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and, it is not limitative to the scope of the present disclosure.

DETAILED DESCRIPTION

For example, an array substrate that is to be applied to a liquid display device includes a plurality of gate lines and a plurality of data lines, and these gate lines and data lines are provided in a cross manner so that they define, for example, pixel units arranged in an array, and each pixel unit may include a thin film transistor, functioning as a switch element, and a pixel electrode as well as a common electrode, and the pixel electrode and the common electrode are employed to control arrangement of liquid crystals. For example, in each pixel, a gate electrode of a thin film transistor is electrically connected or integrally formed with a corresponding gate line, and a source electrode is electrically connected or integrally formed with a corresponding data line, with a drain electrode being electrically connected or integrally formed with a corresponding pixel electrode.

Figure 1A:
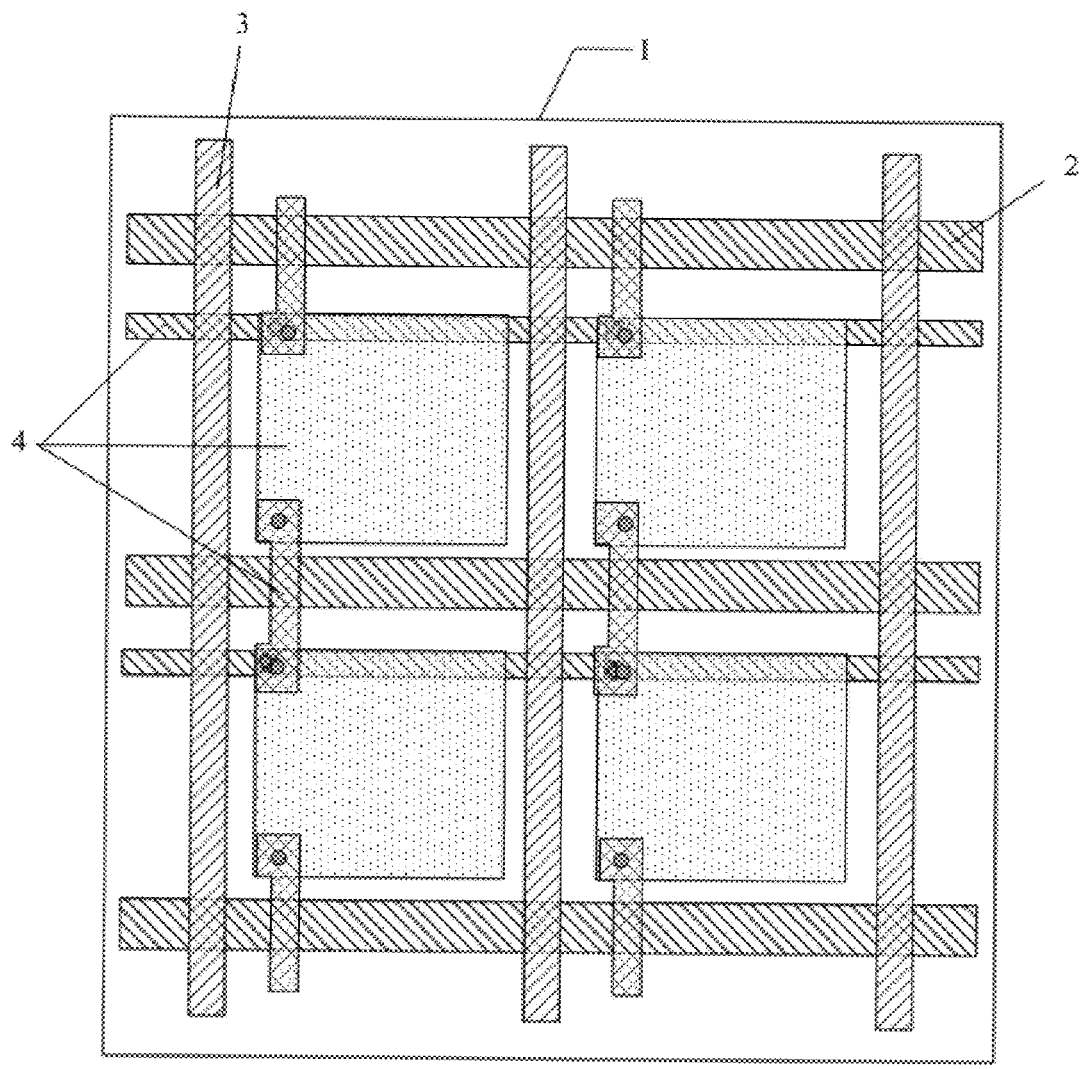
FIG. 1a is a schematic view before repair of an array substrate.
Figure 1B:
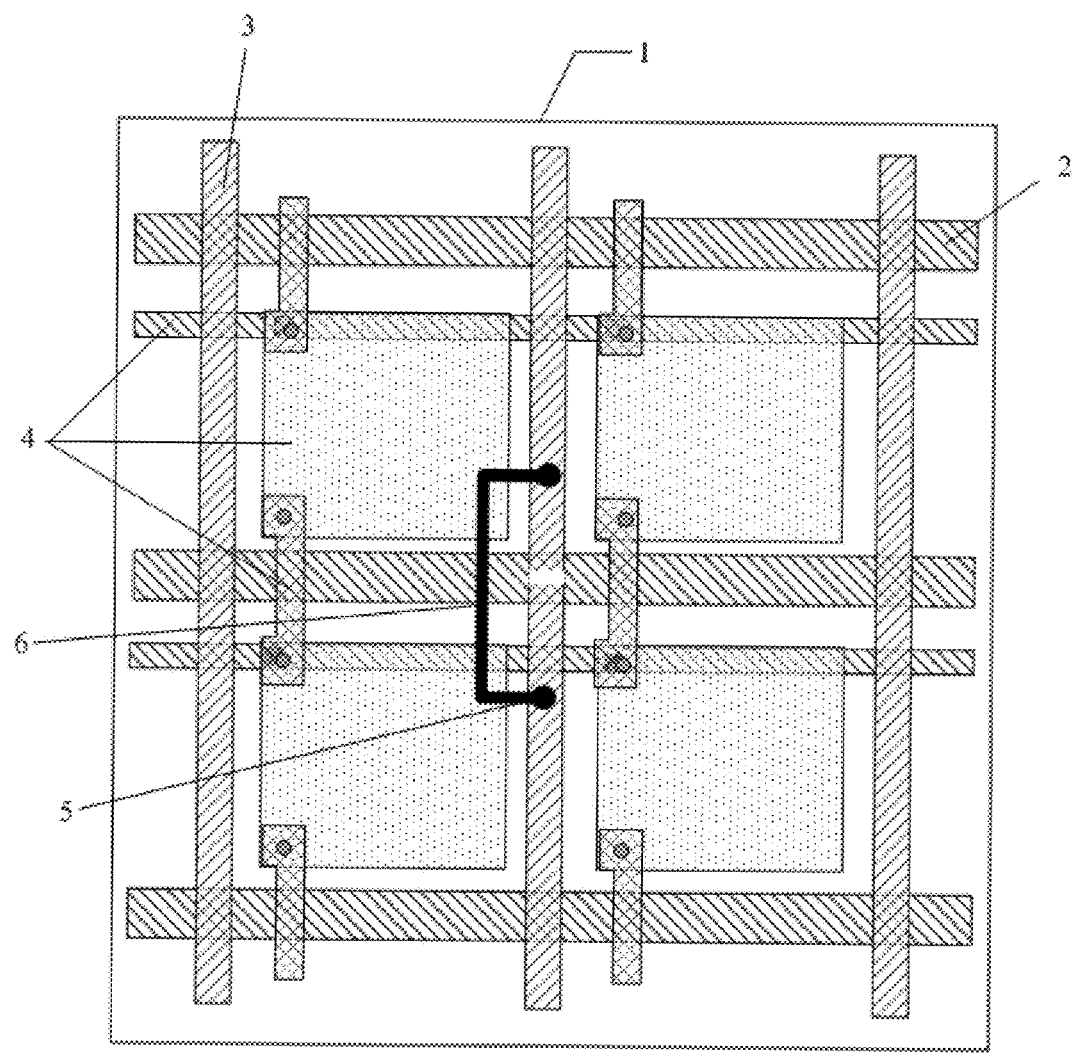
FIG. 1b is a schematic view after repair of an array substrate.

For a broken data line occurring at an overlapping area with a gate line, it is able to employ laser chemical vapor deposition (LCVD) to repair it. As illustrated in FIG. 1a, an array substrate includes a base substrate 1, a gate line 2 provided on the base substrate 1, a data line 3 that is arranged in a cross manner with the gate line 2, a common electrode 4 that is provided above the data line 3 and insulated from the data line 3. As illustrate in FIG. 1b, for example, when a data line 3 suffers from breakage at an overlapping area with the gate line 2, it is needed, firstly, to from via holes 5 at the two sides of the breakage position in the layer stack structure located over the data line 3, and then to employ an LCVD method to deposit a metal wire 6 through the via holes 5 at two sides to connect the separate portions of the broken data line 3.

However, the LCVD method being employed for repair has disadvantages such as a long repair time period due to a slow repair speed and, in addition, metal atoms may diffuse during and after deposition of a metal line, if metal atoms or ions diffuse, a common electrode and a data line in a display panel may be electrically shorted, which can bring about other kind of pixel defects.

At least one embodiment of the present disclosure provides an array substrate, a method of repairing the same, a display panel and a display method; in the array substrate a broken data line can be repaired without employing an LCVD method.

Hereinafter, in combination with drawings, specific implementations of an array substrate, a method of repairing the same, a display panel and a display device, provided in the embodiments of the present disclosure, will be introduced in detail.

Size and shape of each component in figures, instead of reflecting actual scales, intends to only illustrate examples of the present disclosure but not for limitative purpose.

Figure 2:
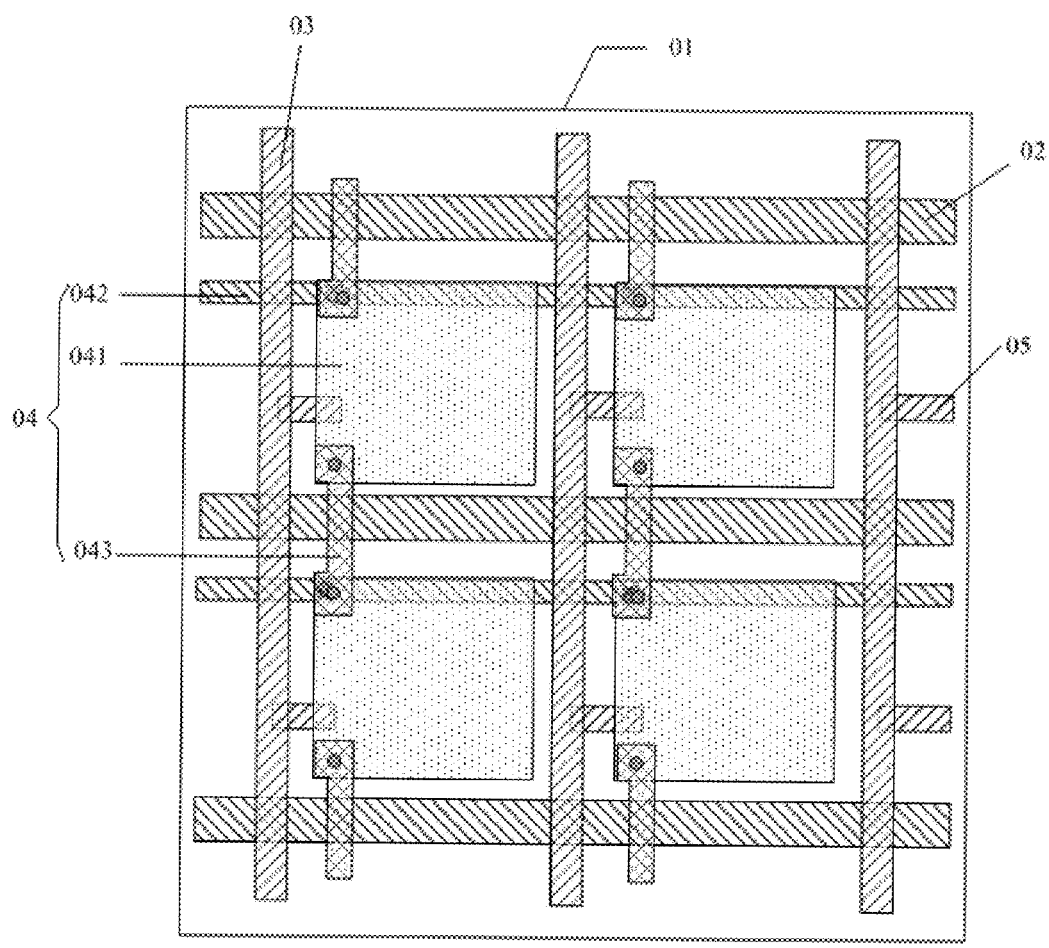
FIG. 2 is a schematic view for structure of an array substrate provided in an embodiment of the present disclosure.

An embodiment of the present disclosure provides an array substrate, as illustrate in FIG. 2, comprising a base substrate 01, gate lines and data lines 03 that are provided in a cross manner on the base substrate 01, and a common electrode 04; the common electrode 04 includes: sub-electrodes 041 each within pixel areas defined by gate lines 02 and data lines 03, common electrode lines 042 that extend in a same direction as the gate lines 02 and are employed to transmit a common voltage signal to the sub-electrodes 041, and connection lines 043 that electrically connect two adjacent sub-electrodes 041 in a direction along which the data lines 03 extend. The array substrate further comprise: data-line repair lines 05, each of which is electrically connected with a data line 03 and insulated from the common electrode 04 in each pixel area, and an orthogonal projection of the data-line repair line 05 on the base substrate has an overlapped area with an orthogonal projection of the sub-electrode 041 or the connection line 043 in the corresponding pixel on the base substrate 01.

In the array substrate provided in an embodiment of the present disclosure, a data-line repair line, which is connected with a data line and insulated from a common electrode, is provided in each pixel area and an orthogonal projection of the data-line repair line 05 on the base substrate of the array substrate has an overlapped area with an orthogonal projection of a sub-electrode or a connection line of the common electrode on the base substrate. The data-line repair line can be employed to, upon breakage of the data line, allow two ends, next to the breakage position, of the data line to be electrically connected together by means of the common electrode.

Figure 3A:
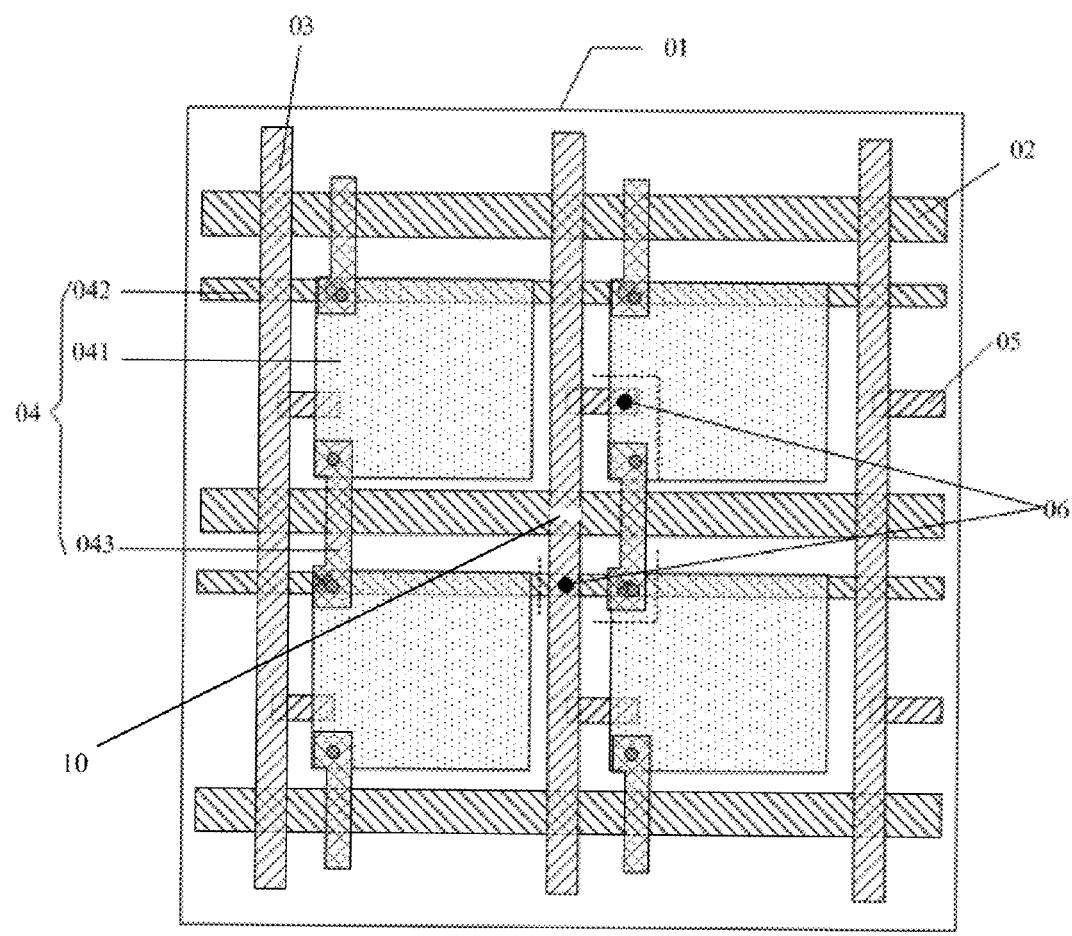
FIG. 3a is a schematic view illustrating repair of a broken data line of the array substrate illustrated in FIG. 2.
Figure 3B:
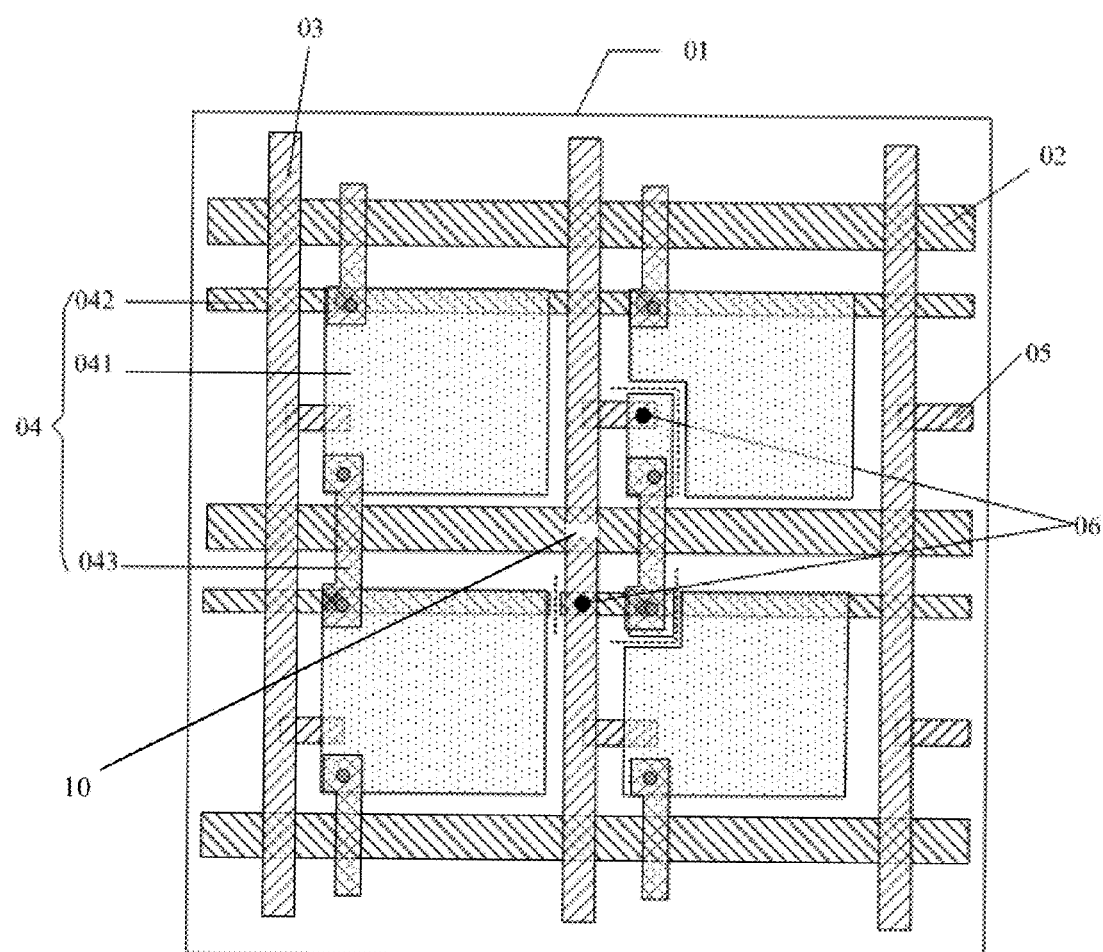
FIG. 3b is a schematic view of the array substrate illustrated in FIG. 2 after repair of the broken data line.

Thus, as illustrated in FIG. 3a, when a breakage (namely, an opening 10 occurs) of a data line 03 at its overlapping area with a gate line 02 occurs in the array substrate, it is able to weld the common electrode line 042, that is closest to the breakage position, with the data line 03 at the overlapping area therebeween, and to weld the data-line repair line 05 with the common electrode 04 at the overlapping area therebetween, and then to cut the common electrode 04 (a cutting line is illustrated with a dashed line in the drawing) so as to make two welding points 06 electrically connected with each other but electrically disconnected from the rest portions of common electrode, as illustrated in FIG. 3b, so that the two ends, next to the breakage position, of the data line 03 are connected via the data-line repair line 05 and a portion divided out of the common electrode 04. That is, the data-line repair line 05 and a divided part of the common electrode 04 are employed as media to connect the separated portions of the broken data line, so that an LCVD method is not necessarily to be employed to deposit a metal line, therefore, a repair time period becomes relatively short and a success rate for repair of an array substrate is greatly increased.

For example, in an array substrate above provided in an embodiment of the present disclosure, an orthogonal projection of a data-line repair line 05 on the base substrate of the array substrate does not overlap an orthogonal projection of a common electrode line 04 on the base substrate.

For example, in an array substrate above provided in an embodiment of the present disclosure, as illustrated in FIG. 2, the common electrode line 042 is provided on a side of the sub-electrode 041, and the data-line repair line 05 is provided between a gate line 02, which is adjacent to and has a further distance from a common electrode line 042 (than another adjacent gate line 02), and the common electrode line 042. In this way, when breakage of a data line 03 occurs at its overlapping area with the gate line 02, the distance between the common electrode line 042 and the data-line repair line 05 that are employed to connect two ends next to breakage position of the date line 03 will be relatively small, which can reduce the portion that is to be cut out of the common electrode 04 for the purpose of connection.

Figure 4:
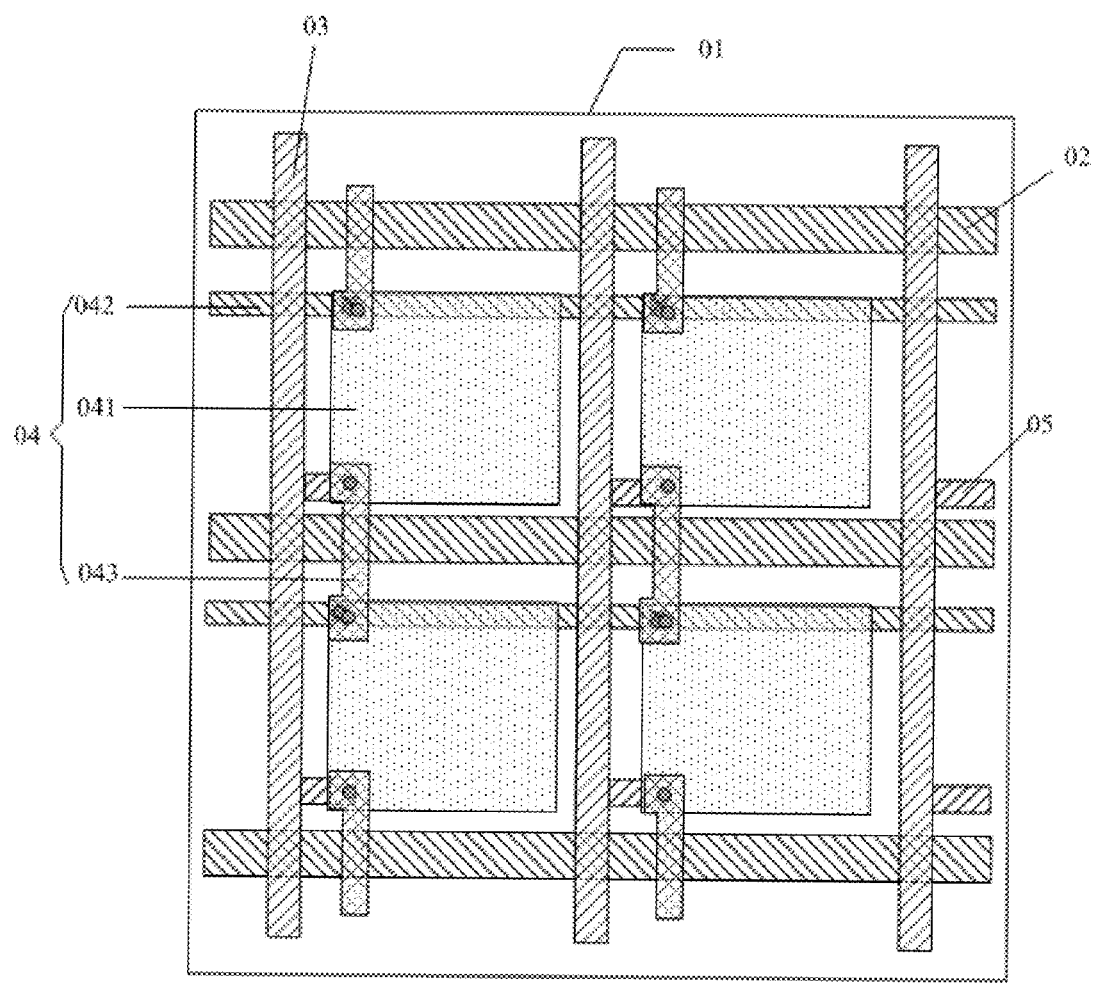
FIG. 4 is a second schematic view for structure of an array substrate provided in an embodiment of the present disclosure.

Therefore, further, in an array substrate provided in an above embodiment of the present disclosure, as illustrated in FIG. 4, a data-line repair line 05, provided between a gate line 02 and a common electrode line 042, is disposed on the side closer to the gate line 02 than the common electrode line 042. That is, the closer the data-line repair line 05 is to the gate line 02, the smaller the distance is between the data-line repair line 05 and the common electrode line 042 at two sides of the breakage position on the data line 03, and the less a portion is cut out of the common electrode 04 for the purpose of connection as well.

For example, in an array substrate provided in above embodiment of the present disclosure, as illustrated in FIG. 4, a data-line repair line 05 is in parallel with the common electrode line 042 in a pixel area where the data-line repair line 05 is located.

For example, in an array substrate provided in an above embodiment of the present disclosure, as illustrated in FIG. 4, a connection line 043 is in parallel with a data line 03; a date line repair line 05 is provided on a side of the data line 03, and the side where the data-line repair line 05 is located is the side, closer to the adjacent connection line 043, of the data line 03 that is electrically connected with the data-line repair line 05. That is, the data-line repair line 05 is located on a side closer to the connection line 043, so if a breakage occurs to the data line 03, a portion that is to be cut out of the common electrode 04 for connection can be reduced.

For example, in an array substrate above provided in the embodiment of the present disclosure, as illustrated in FIG. 4, a data-line repair line 05 is provided on a same layer and of same material as a data line 03, and the data-line repair line 05 is electrically connected with the data line 03 directly. So that, in fabrication of an array substrate, no extra process is added, merely a patterning process for the data line can be modified for this purpose. The data line 03 and the data-line repair line 05 can be formed together via one patterning process, which can reduce fabrication cost and increase added value of a product.

For example, an array substrate, provided in the above embodiment of the present disclosure can further include: pixel electrodes that are provided on a base substrate and insulated from the common electrode; connection lines are provided on a same layer and of same material as the pixel electrodes, and the connection lines are electrically connected with corresponding sub-electrodes through via holes. So that, in fabrication of an array substrate, no extra process is added, merely the patterning process for pixel electrodes can be modified. Patterns of pixel electrodes and connection lines can be formed via one patterning process, which can reduce fabrication cost and increase added value of a product.

In an array substrate provided in an embodiment of the present disclosure, it is also viable to provide two data-line repair lines in each pixel area and the two data-line repair lines are respectively located on two sides of a same gate line and are respectively disposed at a position close to the gate line. In addition, orthogonal projections of the two data-line repair lines on a base substrate respectively have an overlapped area with an orthogonal projection of a common electrode. So upon a breakage occurring to the data line, the two data-line repair lines, a sub-electrode and a connection line can be employed together to repair the broken data line, so as to avoid cutting the common electrode for connection in a subsequent process.

Another embodiment of the present disclosure further provides a display panel, comprising any substrate above provided in any embodiment of the present disclosure. Because the display panel is of similar working principle as the array substrate described before, as for a specific implementation of the display panel, the implementation of an array substrate described before can be referred to, and repeated contents will not be described any more.

Further another embodiment of the present disclosure further provides a display device, comprising any display panel above provided in any embodiment of the present disclosure. The display device can be any product or component having display function such as a cell phone, a tablet computer, a TV set, a display, a laptop computer, a digital photo frame and a navigator. As for implementation of the display device, the embodiment of the display panel above can be referred to, and the repeated contents will not be described any more.

Figure 5:
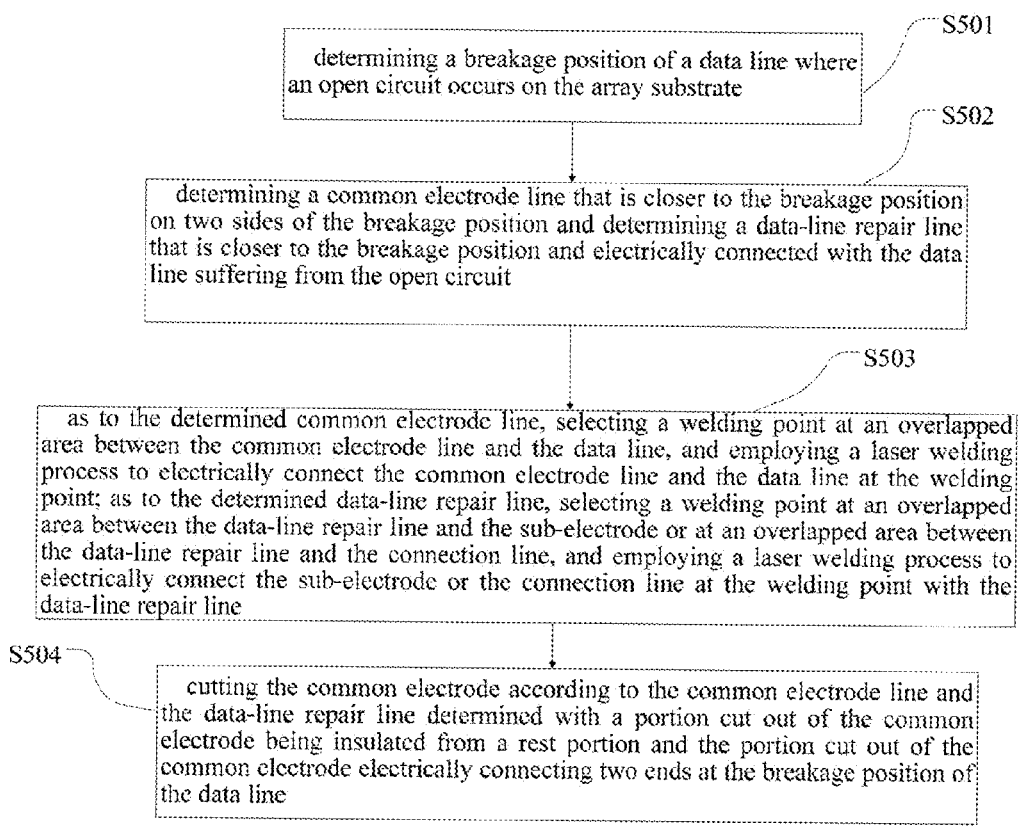
FIG. 5 is a process flowchart for a method of repairing an array substrate provided in an embodiment of the present disclosure.

Still further another embodiment of the present disclosure further provides a method for repairing any array substrate above provided in any embodiment of the present disclosure, as illustrated in FIG. 5, the method includes the following steps.

S501: determining a breakage position of a data line where an open circuit occurs on an array substrate;

S502: determining a common electrode line that is closer to the breakage position on two sides of the breakage position and determining a data-line repair line that is closer to the breakage position and electrically connected with the data line suffering from the open circuit;

S503: as to the determined common electrode line, selecting a welding point at an overlapped area between the common electrode line and the data line, and employing a laser welding process to electrically connect the common electrode line and the data line at the welding point; as to the determined data-line repair line, selecting a welding point at an overlapped area between the data-line repair line and the sub-electrode or at an overlapped area between the data-line repair line and the connection line, and employing a laser welding process to electrically connect the sub-electrode or the connection line at the welding point with the data-line repair line;

S504: cutting the common electrode according to the common electrode line and the data-line repair line determined with a portion cut out of the common electrode being insulated from a rest portion and the portion cut out of the common electrode electrically connecting two ends at the breakage position of the data line.

In the method of repairing the array substrate above provided in the embodiment of the present disclosure, a data-line repair line, that is connected with a data line and insulated from a common electrode, is provided in each pixel area of the array substrate, and an orthogonal projection of the data-line repair line on a base substrate of the array substrate has an overlapped area with an orthogonal projection of a sub-electrode or a connection line on the base substrate. Upon a breakage occurring to the data line, the data-line repair line, together with the common electrode, can allow two ends to the breakage position of the data line to be electrically conducted. Therefore, when a breakage occurs at an overlapping area of a data line with a gate line on the array substrate, it is viable to weld the common electrode line, that is closer to the two ends to the breakage position of the data line, with the data line at the overlapped area therebetween and weld the data-line repair line with the common electrode line at the overlapped area therebetween as well. After that, the common electrode is cut to make two welding points electrically connected with each other, more specifically, allow the two ends to the breakage position of the data line connected via the data-line repair line and the portion cut out of the common electrode. That is, the data-line repair line and a part of the common electrode are employed as media to connect two parts of a broken data line again; therefore, an LCVD method is not needed to deposit a metal line to realize the connection, which reduces repair time and greatly improves rate of success in repairing an array substrate.

In the methods provided in the embodiment of the present disclosure, on a premise of ensuring repair of a data line, the smaller the portion cut out of a common electrode is, the higher quality the array substrate after repair has. Therefore, in a specific implementation, a portion to be cut out of a common electrode can be decided according to actual situations.

Specific embodiments will be taken as examples for description hereinafter.

FIRST EMBODIMENT

As illustrated in FIG. 3b, an orthogonal projection of a data-line repair line 05 on a base substrate 01 of an array substrate has an overlapped area with merely an orthogonal projection of a sub-electrode 041 on the base substrate 01. If a breakage (namely, having a cut 10) occurs to a data line 03, the following conductions can be performed:

1. determining a common electrode line 042 that is closer to the breakage position on two sides of the breakage position, and determining a data-line repair line 05 that is closer to the breakage position and electrically connected with the data line 03 suffering from the open circuit;

2. as to the determined common electrode line 042, selecting a welding point 06 at an overlapped area between the common electrode line 042 and the data line 03, and employing a laser welding process to electrically connect the common electrode line 042 and the data line 03 at the welding point; as to the determined data-line repair line 05, selecting a welding point at an overlapped area between the data-line repair line 05 and the sub-electrode 041, and employing a laser welding process to electrically connect the sub-electrode 041 at the welding point with the data-line repair line 05;

3. cutting the common electrode 04 according to the determined common electrode line 042 and the data-line repair line 05, and cutting the sub-electrode 041 along the welding point 06 of the sub-electrode 041 and the data-line repair line 05, so as to allow a portion cut out of the sub-electrode 041 to be electrically connected with the connection line 043 and allow the connection line 043 to be insulated from a rest portion of the sub-electrode 041. In addition, the common electrode line 042 is cut with a portion cut out of the common electrode line 042 being insulated from the rest portion of the common electrode line 04 while being electrically connected with the portion cut out of the sub-electrode 041, and the portion cut out of the common electrode line 042 is electrically connected with the data line 03 via its welding point 06 with the data line 03, so the portion cut out of the common electrode 04 and the data-line repair line 05 are employed together to repair the two ends to the breakage position of the data line 03.

SECOND EMBODIMENT

Figure 6:
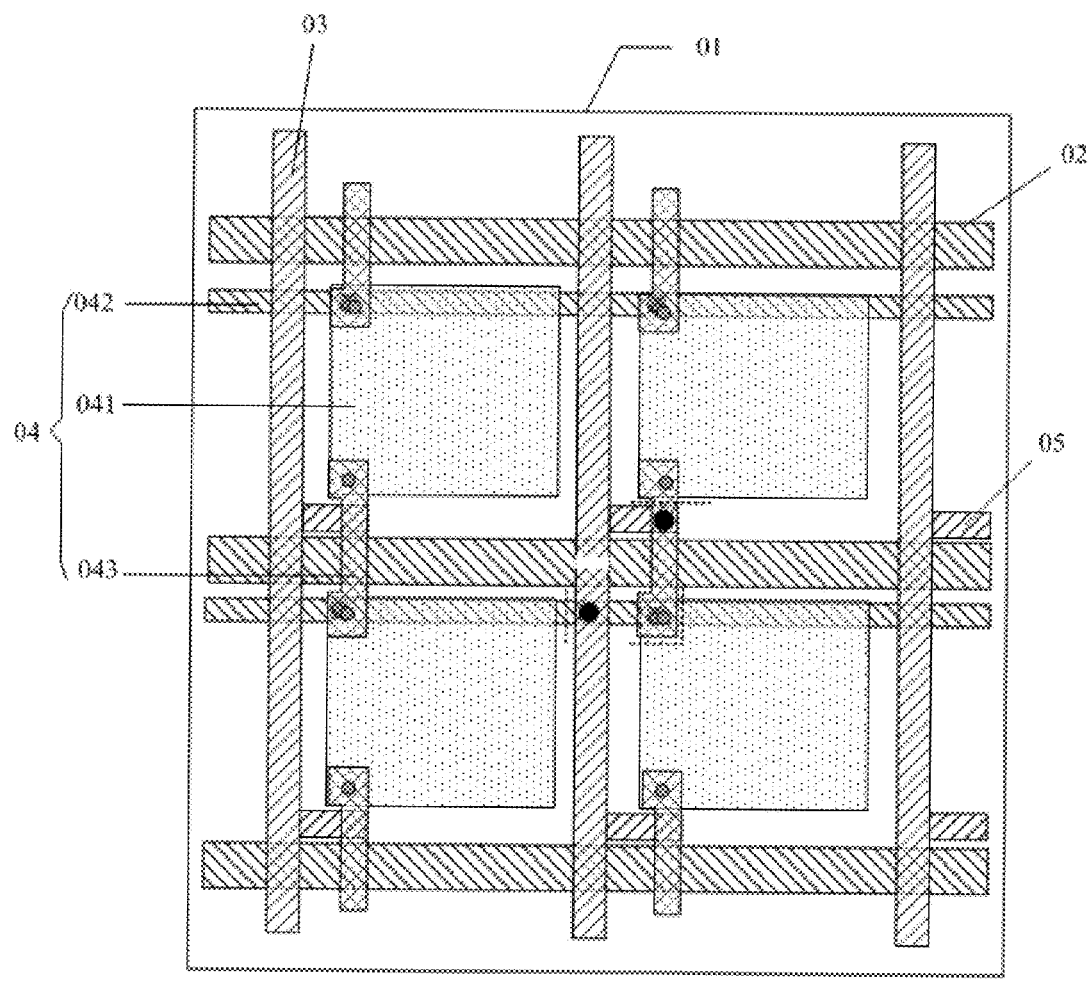
FIG. 6 is a schematic view illustrating repair of a broken data line of the array substrate provided in the second embodiment of the present disclosure.

As illustrated in FIG. 6, an orthogonal projection of a data-line repair line 05 on a base substrate 01 of an array substrate has an overlapped area merely with an orthogonal projection of a connection line 043 on the base substrate 01:

1. determining a common electrode line 042 that is closer to the breakage position on two sides of the breakage position and determining a data-line repair line 05 that is closer to the breakage position and electrically connected with the data line 03 suffering from the open circuit;

2. as to the determined common electrode line 042, selecting a welding point 06 at an overlapped area between the common electrode line 042 and the data line 03, and employing a laser welding process to electrically connect the common electrode line 042 and the data line 03 at the welding point; as to the determined data-line repair line 05, selecting a welding point 06 at an overlapped area between the data-line repair line 05 and the connection line 043, and employing a laser welding process to electrically connect the connection line 043 at the welding point with the data-line repair line 05;

3. cutting the common electrode 04 according to the determined common electrode line 042 and the data-line repair line 05, cutting the connection line 043 along the welding point 06 between the connection line 043 and the data-line repair line 05, and cutting the sub-electrode 041 as well, so as to allow a portion cut out of the sub-electrode 041 to be electrically connected with the connection line 043 and allow the connection line 043 to be insulated from a rest portion of the sub-electrode 041. In addition, the common electrode line 042 is cut to make a portion cut out of the common electrode line 042 insulated from the rest portion of the common electrode line 04 while electrically connected with the portion cut out of the sub-electrode 041, and the portion cut out of the common electrode line 042 is connected with the data line 03 via its welding point 06 with the data line 03, so as to employ the portion cut out of the common electrode 04 and the data-line repair line 05 together to connect the two ends to the breakage position of the data line 03 for repairing (a cutting line is illustrated as a dashed line in FIG. 6).

In the repair methods above provided in the embodiments of the present disclosure, during a broken data line is repaired, a common electrode is cut with a part being separated for connection, however, because the common electrode as a whole over the entire array substrate or part of the array substrate are in an equivalent grid structure, after the common electrode is cut for repairing, the rest portion of the common electrode can still work to transmit common electrode signal via the common electrode line and connection line that are not cut, that is, the signal transmission via rest portion of the common electrode, after the process of cutting, will not be influenced.

An array substrate, a method for repairing the same, a display panel and a display device are provided in the embodiments of the present disclosure. Because a data-line repair line that is connected with a date line and insulated from a common electrode is provided in each pixel area in the array substrate and an orthogonal projection of the data-line repair line on a base substrate of an array substrate has an overlapped area with an orthogonal projection of a sub-electrode or a connection line for a common electrode on the substrate. The data-line repair line is employed, together with the common electrode, to allow two ends to the breakage position of the data line electrically connected with each other when a breakage occurs to the data line. Therefore, when a breakage occurs to a data line at its overlapping area with a gate line on the array substrate, it is viable to weld a common electrode line, that is closer to the two ends to the breakage position, with the data line at the overlapped area therebetween and weld the data-line repair line and the common electrode at the overlapped area therebetween. Then, the common electrode is cut to allow the two welding points electrically connected so as to allow the two ends to the breakage position of the data line connected with each other via the data-line repair line and the portion cut out of the common electrode. That is, the data line and a part of the common electrode are employed as media to connect the disconnected portions of the data line where the breakage occurs to the data line, so that an LCVD method is not needed to deposit a metal line any more, thus repair time is reduced and repair rate of success for an array substrate is greatly increased.

Obviously, those skilled in the art can make various changes or transformation for the present disclosure without going beyond the spirit and scope of the present disclosure. So if these variations or transformations of the present disclosure belong to the scope of the claims in the present disclosure and their equivalent technologies, the present disclosure is intended to include these changes or variations.

The application claims priority to the Chinese patent application No. 201510481670.4, filed Aug. 3, 2015, the entire disclosure of which is incorporated herein by reference as part of the present application.

What is claimed is:

1. An array substrate, comprising:
   a base substrate;
   gate lines and data lines that are arranged in a cross manner on the base substrate and a common electrode, wherein the common electrode comprises: sub-electrodes each in pixel areas defined by the gate lines and the data lines, common electrode lines that extend in a same direction as the gate lines and are employed to transmit a common electrode signal to the sub-electrodes, and connection lines that each electrically connects two sub-electrodes that are adjacent to each other in a direction along which the data lines extend; and data-line repair lines that are connected with the data lines and insulated from the common electrode within the pixel areas, wherein an orthogonal projection of the data-line repair lines on the base substrate has an overlapped area with an orthogonal projection of the sub-electrodes or the connection lines on the base substrate.

2. The array substrate according to claim 1, wherein the orthogonal projection of the data-line repair lines on the base substrate does not overlap with an orthogonal projection of the common electrode lines on the base substrate.

3. The array substrate according to claim 2, wherein the common electrode lines are provided on a side of the sub-electrodes and the data-line repair lines are provided between the gate lines, which are adjacent to and have a greater distance to the common electrode lines, and the common electrode lines.

4. The array substrate according to claim 3, wherein the data-line repair lines provided between the gate lines and the common electrode lines is disposed on a side closer to the gate lines.

5. The array substrate according to claim 2, wherein the data-line repair lines are in parallel with the common electrode lines within the pixel areas that the data-line repair lines belong to respectively.

6. The array substrate according to claim 1, wherein the connection lines are in parallel with the data lines.

7. The array substrate according to claim 6, wherein the data-line repair lines are provided on a side of the data lines, on which side the data lines to which the data-line repair lines are electrically connected respectively are closer to adjacent connection lines.

8. The array substrate according to claim 1, wherein the data-line repair lines are provided on a same layer and formed of a same material as the data lines.

9. The array substrate according to claim 8, wherein the data-line repair lines are directly electrically connected with the data lines.

10. The array substrate according to claim 1, further comprising pixel electrodes that are provided on the base substrate and insulated from the common electrode,
wherein the connection lines are provided on a same layer and formed of a same material as the pixel electrodes and the connection lines are electrically connected to corresponding sub-electrodes by means of via holes.

11. The array substrate according to claim 2, wherein the data-line repair lines are provided on a same layer and formed of a same material as the data lines.

12. The array substrate according to claim 11, wherein the data-line repair lines are directly electrically connected with the data lines.

13. The array substrate according to claim 2, further comprising pixel electrodes that are provided on the base substrate and insulated from the common electrode,
wherein the connection lines are provided on a same layer and formed of a same material as the pixel electrodes and the connection lines are electrically connected to corresponding sub-electrodes by means of via holes.

14. The array substrate according to claim 3, wherein the data-line repair lines are provided on a same layer and formed of a same material as the data lines.

15. The array substrate according to claim 14, wherein the data-line repair lines are directly electrically connected with the data lines.

16. The array substrate according to claim 3, further comprising pixel electrodes that are provided on the base substrate and insulated from the common electrode,
wherein the connection lines are provided on a same layer and formed of a same material as the pixel electrodes and the connection lines are electrically connected to corresponding sub-electrodes by means of via holes.

17. A display panel, comprising the array substrate according to claim 1.

18. A display device, comprising the display panel according to claim 17.

19. A method of repairing the array substrate according to claim 1, comprising:
determining a breakage position of a data line where an open circuit occurs on the array substrate;
determining a common electrode line that is closer to the breakage position on two sides of the breakage position, and determining a data-line repair line that is closer to the breakage position and electrically connected with the data line suffering from the open circuit;
as to the determined common electrode line, selecting a welding point at an overlapped area between the common electrode line and the data line, and employing a laser welding process to electrically connect the common electrode line and the data line at the welding point; as to the determined data-line repair line, selecting a welding point at an overlapped area between the data-line repair line and a sub-electrode or at an overlapped area between the data-line repair line and a connection line, and employing a laser welding process to electrically connect the sub-electrode or the connection line at the welding point with the data-line repair line; and
cutting the common electrode according to the common electrode line and the data-line repair line determined to allow a portion cut out of the common electrode to be insulated from a rest portion and allow the portion cut out of the common electrode to electrically connect two ends to the breakage position of the data line.

* * * * *